United States Patent
Wu et al.

(10) Patent No.: US 12,315,041 B2
(45) Date of Patent: May 27, 2025

(54) DISPLAY CONTROL METHOD AND DEVICE APPLIED TO MONITOR APPARATUS, COMPUTER-READABLE STORAGE MEDIUM FOR DISPLAY CONTROL METHOD AND DISPLAY DEVICE INCLUDING DISPLAY CONTROL DEVICE

(71) Applicant: BOE TECHNOLOGY GROUP CO., LTD., Beijing (CN)

(72) Inventors: Congrui Wu, Beijing (CN); Youxiang Xia, Beijing (CN); Xitong Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/796,646

(22) PCT Filed: Aug. 30, 2021

(86) PCT No.: PCT/CN2021/115321
§ 371 (c)(1),
(2) Date: Jul. 30, 2022

(87) PCT Pub. No.: WO2023/028755
PCT Pub. Date: Mar. 9, 2023

(65) Prior Publication Data
US 2024/0185479 A1 Jun. 6, 2024

(51) Int. Cl.
*G06T 11/00* (2006.01)
*G06T 7/60* (2017.01)
(Continued)

(52) U.S. Cl.
CPC .............. *G06T 11/001* (2013.01); *G06T 7/60* (2013.01); *G06T 7/70* (2017.01); *G09G 3/2003* (2013.01);
(Continued)

(58) Field of Classification Search
None
See application file for complete search history.

(56) References Cited

U.S. PATENT DOCUMENTS

| 2013/0027420 A1 | 1/2013 | Felt |
| 2014/0037165 A1 | 2/2014 | King et al. |

(Continued)

FOREIGN PATENT DOCUMENTS

| CN | 101923455 A | 12/2010 |
| CN | 103430536 A | 12/2013 |

(Continued)

OTHER PUBLICATIONS

European Patent Office, EESR dated Apr. 29, 2024, for corresponding EP application 21955336.9.

*Primary Examiner* — Joni Hsu
(74) *Attorney, Agent, or Firm* — HOUTTEMAN LAW LLC

(57) ABSTRACT

Display control method, display control device, non-transitory computer-readable storage medium and display device are disclosed. The display control method including: performing following steps in response to a data visualization display instruction: in response to a coordinate selection instruction, determining target coordinate position corresponding to the coordinate selection instruction in source image displayed on display panel, and determining an active region at least covering the target coordinate position according to the target coordinate position; acquiring image information of the active region; generating at least one image to be superimposed according to the image information of the active region, with the at least one image to be superimposed including pattern configured to represent the image information of the active region; and superimposing each image to be superimposed on the source image to (Continued)

obtain an output image, and outputting the output image to the display panel to be displayed.

18 Claims, 6 Drawing Sheets

(51) Int. Cl.
    *G06T 7/70*         (2017.01)
    *G09G 3/20*         (2006.01)
    *G09G 5/377*       (2006.01)

(52) U.S. Cl.
    CPC ......... *G09G 5/377* (2013.01); *G09G 2320/02* (2013.01)

(56) References Cited

U.S. PATENT DOCUMENTS

| | | |
|---|---|---|
| 2014/0176487 A1 | 6/2014 | Kikuchi |
| 2015/0149875 A1 | 5/2015 | Masuko |
| 2015/0154903 A1* | 6/2015 | Miura ................... G09G 3/2003 |
| | | 345/690 |
| 2016/0155242 A1* | 6/2016 | Bean ...................... G06T 15/503 |
| | | 345/592 |
| 2018/0210623 A1 | 7/2018 | Tanaka et al. |
| 2022/0058999 A1* | 2/2022 | Vleugels .................. G09G 3/02 |

FOREIGN PATENT DOCUMENTS

| | | |
|---|---|---|
| CN | 106598533 A | 4/2017 |
| CN | 108200415 A | 6/2018 |
| CN | 108345420 A | 7/2018 |
| CN | 108846084 A | 11/2018 |
| CN | 109286801 A | 1/2019 |
| CN | 110913262 A | 3/2020 |
| CN | 111815786 A | 10/2020 |
| JP | H10124039 A | 5/1998 |
| JP | 2006126918 A | 5/2006 |
| JP | 2015138428 A | 7/2015 |
| WO | WO2019148265 A1 | 8/2019 |

* cited by examiner

FIG.5

| Absolute | Ordinate | R compressed | G compressed | B compressed | Normalized R compressed | Normalized G compressed | Normalized B compressed | Y compressed | Cb compressed | Cr compressed | Normalized Y compressed | CE-1st | | | CE-2nd | | | CE-15th | |
|---|---|---|---|---|---|---|---|---|---|---|---|---|---|---|---|---|---|---|---|
| | | | | | | | | | | | | x compressed | y compressed | compressed | y compressed | compressed | compressed | y compressed | compressed |
| Current video | | | | | | | | | | | | | | | | | | | |
| Reference video | | | | | | | | | | | | | | | | | | | |
| Difference | | | | | | | | | | | | | | | | | | | |

DISPLAY CONTROL METHOD AND DEVICE APPLIED TO MONITOR APPARATUS, COMPUTER-READABLE STORAGE MEDIUM FOR DISPLAY CONTROL METHOD AND DISPLAY DEVICE INCLUDING DISPLAY CONTROL DEVICE

TECHNICAL FIELD

The present disclosure relates to the field of display technologies, and in particular, to a display control method, a display control device, a non-transitory computer-readable storage medium, and a display device.

BACKGROUND

In application scenarios of some display devices (such as monitors), there are usually high requirements on display quality of the display devices and color reproduction level of images. Therefore, some related data of the images need to be provided for a user, so as to provide objective reference data for subsequent operations (such as color correction of the images or color matching of the images) of the user.

SUMMARY

For solving at least one of the technical problems in the prior art, the present disclosure provides a display control method, a display control device, a non-transitory computer-readable storage medium, and a display device.

In order to achieve the above objective, the present disclosure provides a display control method, including: performing following steps in response to a data visualization display instruction:

in response to a coordinate selection instruction, determining a target coordinate position corresponding to the coordinate selection instruction in a source image displayed on a display panel, and determining an active region at least covering the target coordinate position according to the target coordinate position;

acquiring image information of the active region;

generating at least one image to be superimposed according to the image information of the active region, with the at least one image to be superimposed including a pattern configured to represent the image information of the active region; and superimposing each of the at least one image to be superimposed on the source image to obtain an output image, and outputting the output image to the display panel to be displayed on the display panel.

In some embodiments, the image information of the active region includes pixel information of a target pixel located at the target coordinate position in the active region, the pixel information of the target pixel includes a current value of a first characteristic parameter of the target pixel, and a current value of a second characteristic parameter obtained by performing characteristic conversion on the current value of the first characteristic parameter of the target pixel; the at least one image to be superimposed includes a first image to be superimposed including first effective patterns for representing the pixel information of the target pixel; and in the step of superimposing each of the at least one image to be superimposed on the source image, the first image to be superimposed is superimposed on a first region to be superimposed in a target superimposition region of the source image;

and/or the image information of the active region includes a current value of a first characteristic parameter of each pixel in the active region; the at least one image to be superimposed includes a second image to be superimposed including a plurality of second effective patterns, each of the plurality of second effective patterns corresponds to one pixel in the active region, and different second effective patterns correspond to different pixels in the active region; each of the plurality of second effective patterns is configured to represent a current value of a first characteristic parameter of a corresponding pixel; and in the step of superimposing the at least one image to be superimposed on the source image, the second image to be superimposed is superimposed on a second region to be superimposed in the target superimposition region of the source image.

In some embodiments, the first characteristic parameter includes an R component of the pixel in RGB space, a G component of the pixel in the RGB space, and a B component of the pixel in the RGB space; and the second characteristic parameter includes at least one of:

a normalized R component, a normalized G component, a normalized B component, a Y component of the pixel in YCbCr space, a Cb component of the pixel in the YCbCr space, a Cr component of the pixel in the YCbCr space, a normalized Y component, an x component of the pixel in CIE-1931 space, a y component of the pixel in the CIE-1931 space, a z component of the pixel in the CIE-1931 space, a u' component of the pixel in CIE-1976 space, and a v' component of the pixel in the CIE-1976 space.

In some embodiments, the image information of the active region specifically includes the pixel information of the target pixel, and the pixel information of the target pixel includes the current value of the first characteristic parameter of the target pixel, and the current value of the second characteristic parameter obtained by performing characteristic conversion on the current value of the first characteristic parameter of the target pixel, a reference value of the first characteristic parameter of the target pixel, a difference between the current value of the first characteristic parameter and the reference value of the first characteristic parameter of the target pixel, a reference value of the second characteristic parameter of the target pixel, and a difference between the current value of the second characteristic parameter and the reference value of the second characteristic parameter of the target pixel.

In some embodiments, the reference value of the first characteristic parameter and the reference value of the second characteristic parameter are stored in a cache module in advance, and the display control method further includes:

after the image information of the active region is acquired, sending an update request signal to prompt a user to input an update confirmation instruction or an update rejection instruction;

when the update confirmation instruction is received, updating the reference value of the first characteristic parameter stored in the cache module according to the current value of the first characteristic parameter, and updating the reference value of the second characteristic parameter stored in the cache module according to the current value of the second characteristic parameter.

In some embodiments, the at least one image to be superimposed includes the first image to be superimposed including the first effective patterns for representing the pixel information of the target pixel, and a first background pattern surrounding the first effective patterns, and the first effective patterns are different from the first background pattern in color.

In some embodiments, a color of the first background pattern is the same as that of the target pixel.

In some embodiments, the at least one image to be superimposed includes the second image to be superimposed including a plurality of sub-regions, each of the plurality of sub-regions corresponds to one pixel in the active region, and different sub-regions correspond to different pixels in the active region; and each of the plurality of sub-regions includes: the second effective pattern and a second background pattern surrounding the second effective pattern, and the second effective pattern is configured to represent the current value of the first characteristic parameter of the corresponding pixel in the active region; and the second effective pattern is different from the second background pattern in color.

In some embodiments, a color of the second background pattern is the same as that of the corresponding pixel.

In some embodiments, the second image to be superimposed further includes a marker line pattern located at an edge of a sub-region corresponding to the target pixel which is the pixel located at the target coordinate position in the active region, and a color of the marker line pattern is different from colors of second background patterns adjacent to the marker line pattern.

In some embodiments, the plurality of sub-regions of the second image to be superimposed are arranged according to a preset rule.

In some embodiments, the at least one image to be superimposed further includes:
a third image to be superimposed including a first mark pattern and a second mark pattern;
and the third image to be superimposed is superimposed on the active region in a step of superimposing the third image to be superimposed on the source image, and a center of the first mark pattern corresponds to the target coordinate position, and the second mark pattern corresponds to a boundary position of the active region.

In some embodiments, the source image includes: a main superimposition region and an auxiliary superimposition region, which do not overlap each other; and
the display control method further includes:
determining whether the active region overlaps the main superimposition region; and
when the active region overlaps the main superimposition region, taking the auxiliary superimposition region as the target superimposition region.

In some embodiments, superimposing each of the at least one image to be superimposed on the source image to obtain the output image specifically includes:
determining a region to be superimposed of the source image which corresponds to each image to be superimposed, with the region to be superimposed being a region of the source image in which the image to be superimposed is superimposed, and pixels in the region to be superimposed being in one-to-one correspondence with pixels in a corresponding image to be superimposed;
for any region to be superimposed and the corresponding image to be superimposed, generating a conversion pixel value of each pixel in the region to be superimposed according to a first weight and an initial pixel value of each pixel in the region to be superimposed; generating a conversion pixel value of each pixel in the image to be superimposed according to a second weight and an initial pixel value of each pixel in the image to be superimposed; and obtaining a target pixel value of each pixel in the region to be superimposed according to the conversion pixel value of each pixel in the region to be superimposed and the conversion pixel value of each pixel in the image to be superimposed; and
replacing the initial pixel value of each pixel in each region to be superimposed of the source image with the target pixel value, so as to obtain the output image.

In some embodiments, determining the active region according to the target coordinate position specifically includes:
determining the active region according to the target coordinate position and regional size parameters.

The embodiments of the present disclosure further provide a display control device, including: a function initiating module, an active region determining module, an information acquiring module, an image generating module, and a superimposition module, wherein,
the function initiating module is configured to output an initiation signal to the active region determining module in response to a data visualization display instruction;
the active region determining module is configured to determine, after receiving the initiation signal, a target coordinate position corresponding to a coordinate selection instruction in a source image displayed on a display panel in response to the coordinate selection instruction, and determine, according to the target coordinate position, an active region at least covering the target coordinate position corresponding to the coordinate selection instruction;
the information acquiring module is configured to acquire image information of the active region;
the image generating module is configured to generate at least one image to be superimposed according to the image information of the active region, with the at least one image to be superimposed including a pattern configured to represent the image information of the active region; and
the superimposition module is configured to superimpose each of the at least one image to be superimposed on the source image to obtain an output image, and output the output image to the display panel to be displayed.

In some embodiments, the superimposition module specifically includes:
a determination unit configured to determine a region to be superimposed of the source image corresponding to each image to be superimposed, with the region to be superimposed being a region of the source image in which the image to be superimposed is superimposed, and pixels in the region to be superimposed being in one-to-one correspondence with pixels in a corresponding image to be superimposed;
a calculation unit configured to generate, for any region to be superimposed and the corresponding image to be superimposed, a conversion pixel value of each pixel in the region to be superimposed according to a first weight and an initial pixel value of each pixel in the region to be superimposed, generate a conversion pixel value of each pixel in the image to be superimposed according to a second weight and an initial pixel value of each pixel in the image to be superimposed, and obtain a target pixel value of each pixel in the region to be superimposed according to the conversion pixel value of each pixel in the region to be superimposed and the conversion pixel value of each pixel in the image to be superimposed; and a generation unit configured to replace the initial pixel value of each pixel in each region to be superimposed of the source image with the target pixel value to generate the output image.

The embodiments of the present disclosure further provide a non-transitory computer-readable storage medium having a computer program stored thereon, wherein the computer program implements the above display control method when being executed by a processor.

The embodiments of the present disclosure further provide a display device, including: a display panel and the above-mentioned display control device.

BRIEF DESCRIPTION OF DRAWINGS

The accompanying drawings are intended to provide a further understanding of the present disclosure, and constitute a part of the specification. The drawings are used to explain the present disclosure in conjunction with the specific embodiments below, but do not constitute any limitation to the present disclosure. In the drawings:

FIG. 5 is a schematic diagram of contents to be displayed in a first image to be superimposed according to some embodiments of the present disclosure.

FIG. 6 is a schematic diagram of the contents to be displayed in the first image to be superimposed according to some other embodiments of the present disclosure.

FIG. 7 is a schematic diagram of contents displayed in a second image to be superimposed according to some embodiments of the present disclosure.

FIG. 8 is a schematic diagram illustrating distribution of regions in a source image according to some embodiments of the present disclosure.

DETAIL DESCRIPTION OF EMBODIMENTS

The specific embodiments of the present disclosure are described in detail below with reference to the drawings. It should be understood that the specific embodiments described herein are merely used to illustrate and explain the present disclosure, rather than limiting the present disclosure.

The embodiments of the present disclosure provide a display control method, which can be applied to a monitor apparatus. The monitor apparatus includes a control device and a display panel, and the control device is configured to provide a driving signal for the display panel to control the display panel to perform displaying. The display control method can be performed by the control device.

Figure 1:
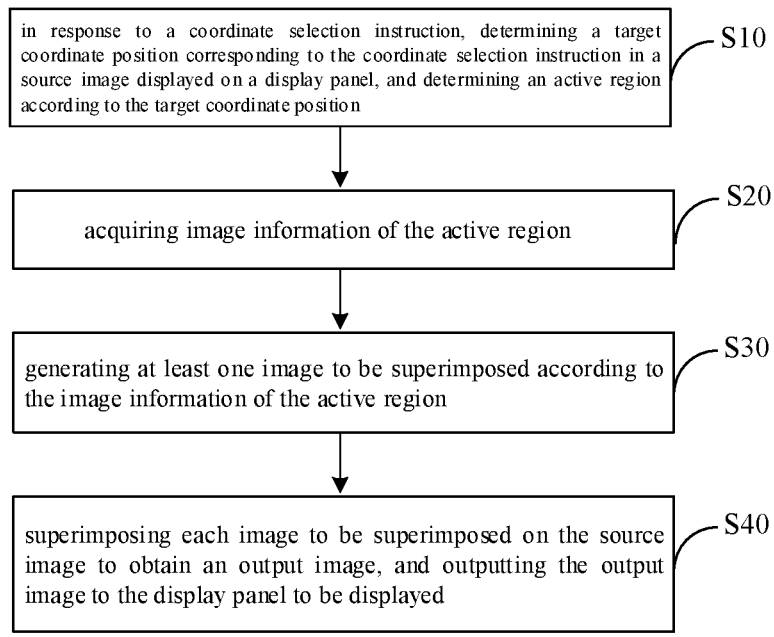
FIG. 1 is a schematic diagram of a display control method according to some embodiments of the present disclosure.

FIG. 1 is a schematic diagram of a display control method according to some embodiments of the present disclosure. As shown in FIG. 1, the display control method includes: performing the following steps S10 to S40 in response to a data visualization display instruction.

The data visualization display instruction may be input to the control device by a user. When receiving the visualization display instruction, the control device controls the display panel to keep displaying a current image (referred to as a source image), and the source image may be a picture which is displayed, or a frame of image which is intercepted from a displayed video stream and is kept.

In the step S10, a target coordinate position corresponding to a coordinate selection instruction in the source image displayed on the display panel is determined in response to the coordinate selection instruction, and an active region at least covering the target coordinate position is determined according to the target coordinate position.

Optionally, in practical applications, the control device may control the display panel to display the source image and a cursor pattern in a display region of the display panel, and the user may input an adjustment instruction to the control device to adjust a position of the cursor pattern; and when the cursor pattern moves to a certain position, the user may input the coordinate selection instruction to the control device, and at this time, the position of the cursor pattern is the target coordinate position.

Optionally, in practical applications, when the display panel is a touch display panel, the user may touch the source image displayed in the display region to directly select the target coordinate position.

Optionally, the active region may be a part of the source image.

In the step S20, image information of the active region is acquired, with the image information of the active region including pixel information of at least some pixels in the active region. For example, the pixel information may include: components of each primary color of the pixels in RGB space, and components of each primary color of the pixels in YCbCr space.

In the step S30, at least one image to be superimposed is generated according to the image information of the active region, where the at least one image to be superimposed includes a pattern configured to represent the image information of the active region.

In the step S40, each image to be superimposed is superimposed on the source image to obtain an output image, and the output image is output to the display panel to be displayed.

For example, the image information of the active region includes: pixel information of a pixel at the target coordinate position. In this case, a character pattern may be generated according to the pixel information of the pixel at the target coordinate position, and may be superimposed on the source image to obtain the output image, and the display panel may be driven to display the output image. For example, in a case where the number of images to be superimposed is one, and a current value of R component, a current value of G component and a current value of B component of the pixel at the target coordinate position in the RGB space are 100, 200 and 100 respectively, the image to be superimposed includes a character pattern of "Y: 100, G:200, B:100", and the character pattern is superimposed on the source image to generate the output image, so that the user may visually see the pixel information directly.

In the embodiments of the present disclosure, the control device may determine the corresponding active region according to the coordinate selection instruction, and generate the at least one image to be superimposed according to the image information of the active region, and the generated at least one image to be superimposed includes the character pattern(s) which can represent the image information of the active region. In addition, the control device superimposes each image to be superimposed on the source image to obtain the output image, and controls the display panel to display the output image, that is, the display panel may visually display the image information of the active region while displaying the source image, thereby providing accurate reference data for a subsequent operation (e.g., correcting colors of an image) of the user.

Figure 2:
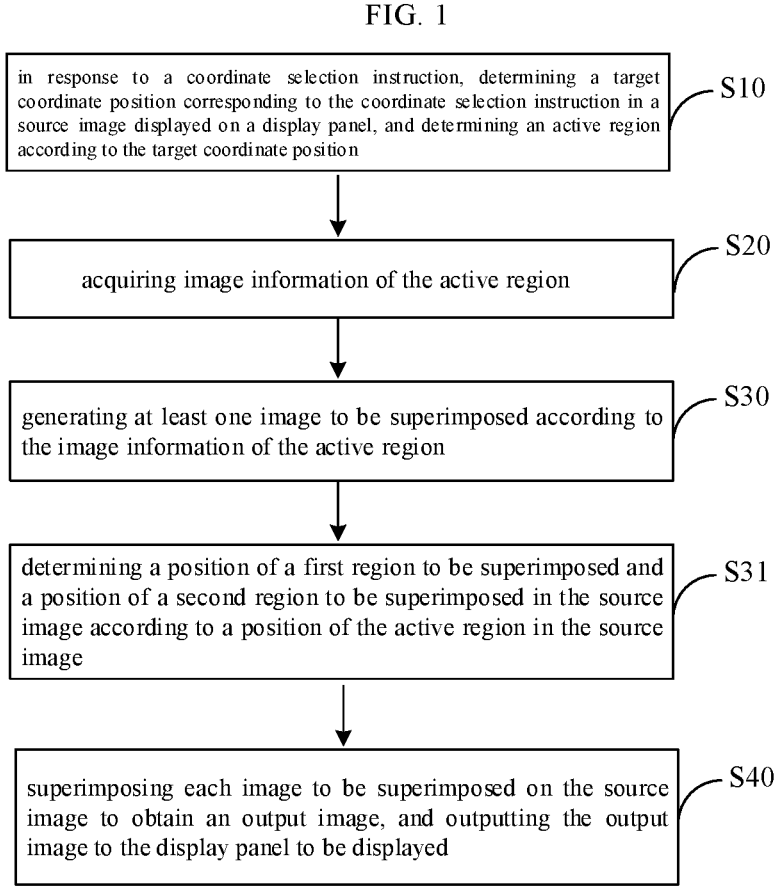
FIG. 2 is a schematic diagram of a display control method according to some other embodiments of the present disclosure.

FIG. 2 is a schematic diagram of a display control method according to some other embodiments of the present disclosure. As shown in FIG. 2, the display control method includes: performing the following steps S10 to S40 in response to a data visualization display instruction.

In the step S10, a target coordinate position corresponding to a coordinate selection instruction in the source image displayed on the display panel is determined in response to the coordinate selection instruction, and an active region at least covering the target coordinate position is determined according to the target coordinate position.

In some embodiments, the determining the active region according to the target coordinate location may specifically include: determining the active region according to the target coordinate position and regional size parameters. The regional size parameters include a size parameter of the active region and a shape parameter of the active region. In one example, the regional size parameters may be set in advance. In another example, the regional size parameters may be set by the user, for example, a display control device may output a parameter setting request to request the user to input specific data of the shape parameter, the size parameter and other parameters of the active region, and determine a position and a range of the active region according to the specific data of the shape parameter and the size parameter input by the user.

Figure 3:
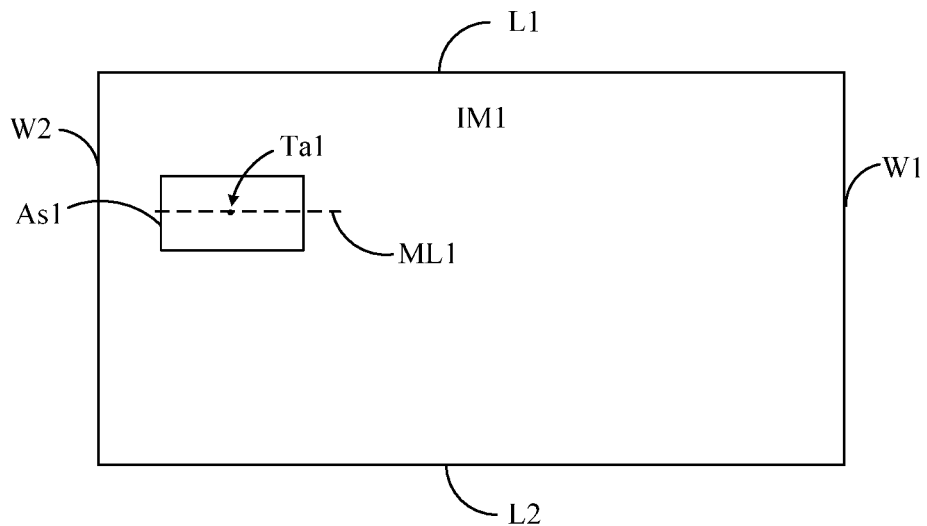
FIG. 3 is a schematic diagram illustrating a positional relationship between a target coordinate position and an active region according to some examples of the present disclosure.
Figure 4:
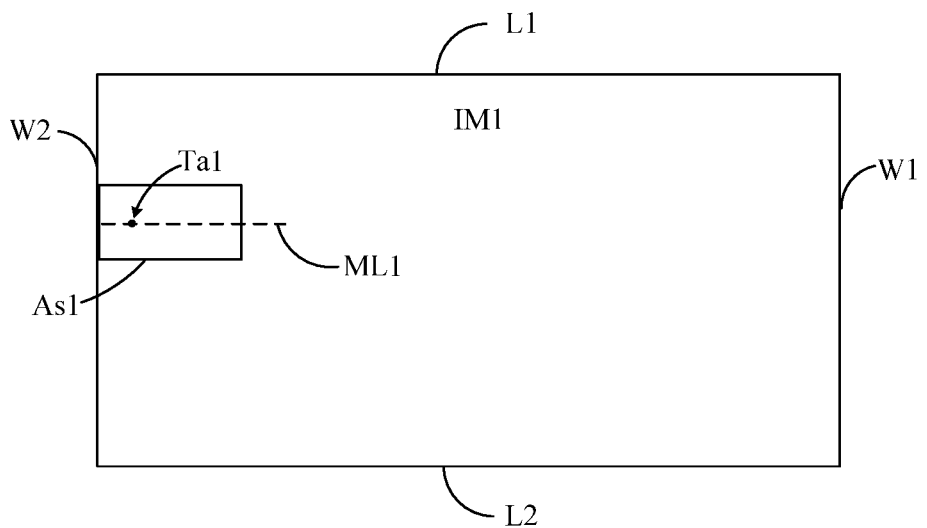
FIG. 4 is a schematic diagram illustrating another positional relationship between the target coordinate position and the active region according to some examples of the present disclosure.

FIG. 3 is a schematic diagram illustrating a positional relationship between the target coordinate position and the active region according to some examples of the present disclosure, and FIG. 4 is a schematic diagram illustrating another positional relationship between the target coordinate position and the active region according to some examples of the present disclosure. In some examples, as shown in FIG. 3 and FIG. 4, the active region As1 may be a rectangular region having a length and a width that may be set in advance, for example, the rectangular region has a size of 17×9 (that is, the rectangular region includes 17 columns of pixels and 9 rows of pixels), a width direction of the active region As1 is the same as that of the source image IM1, and the source image IM1 has four sides, which are a first short side W1 and a second short side W2 that extend in the width direction, and a first long side L1 and a second long side L2 that extend in a length direction. As shown in FIG. 3, when a distance from the target coordinate position Ta1 to each side of the source image IM1 is relatively large, the range of the active region As1 may be determined according to the size of the active region As1 and the target coordinate position Ta1, and the target coordinate position Ta1 may be located at the center of the active region As1. As shown in FIG. 4, when a distance from the target coordinate position Ta1 to the first short side W1 is small, and a distance from the target coordinate position Ta1 to the first long side L1 and a distance from the target coordinate position Ta1 to the second long side L2 are both large, the range of the active region As1 may be determined according to the size of the active region As1 and the target coordinate position Ta1, the active region As1 may be brought into contact with the first short side W1, and the target coordinate position Ta1 may be located on a center line ML1 of the active region As1 in the width direction thereof. Similarly, when the distance from the target coordinate position Ta1 to the first long side L1 (or the second long side L2) is small, and the distance from the target coordinate position Ta1 to the first short side W1 and a distance from the target coordinate position Ta1 to the second short side W2 are both large, the active region As1 is brought into contact with the first long side L1 (or the second long side L2), and the target coordinate position Ta1 is located on a center line of the active region As1 in a length direction thereof.

It should be noted that the shape of the active region and the way of determining the active region described above are only for illustration. In other examples, the active region may be in other shapes, and may be determined in other ways, which are not listed here one by one.

Optionally, when the display panel is a touch display panel, the user may touch the source image displayed in the display region to select a region, and may select the target coordinate position by box selection, and the region selected by box selection is the active region, and includes the target coordinate position.

In the step S20, image information of the active region is acquired.

In some embodiments, the image information of the active region may specifically include pixel information of a target pixel located at the target coordinate position in the active region, the pixel information of the target pixel includes a current value of a first characteristic parameter of the target pixel and a current value of a second characteristic parameter obtained by performing characteristic conversion on the current value of the first characteristic parameter of the target pixel, and the pixel information of the target pixel may further include coordinates of the target pixel. In some embodiments, the image information of the active region may further include current values of first characteristic parameters of all pixels in the active region except for the target pixel, and coordinates of all pixels in the active region except for the target pixel. It should be noted that the pixels in the source image are arranged in an array, and the "coordinates" of a pixel in the embodiments of the present disclosure include an abscissa which is an ordinal number of a column where the pixel is located in the source image, and an ordinate which is an ordinal number of a row where the pixel is located in the source image.

Optionally, the first characteristic parameter may include: an R component, a G component and a B component of the pixel in the RGB space. The second characteristic parameter may include at least one of a normalized R component, a normalized G component, a normalized B component, a Y component of the pixel in the YCbCr space, a Cb component of the pixel in the YCbCr space, a Cr component of the pixel in the YCbCr space, a normalized Y component, an x component of the pixel in CIE-1931 space, a y component of the pixel in the CIE-1931 space, a z component of the pixel in the CIE-1931 space, a u' component of the pixel in CIE-1976 space, and a v' component of the pixel in the CIE-1976 space.

In some embodiments, image information of the source image may be provided for the control device by an image source, and the image information of the source image provided by the image source includes an R component, a G component and a B component of each pixel. In this case, a current value of a first characteristic parameter of each pixel may be obtained by directly extracting from the image information provided by the image source; or, the current value of the first characteristic parameter of each pixel may be obtained by extracting from the image information provided by the image source and performing bit conversion on the extracted data. For example, in a case where the image information provided by the image source includes an initial value of the R component of each pixel, an initial value of the G component of each pixel, and an initial value of the B component of each pixel, and the initial value of each component is 10-bit data, for any pixel in the source image, the initial value of the R component of the pixel, the initial value of the G component of the pixel, and the initial value of the B component of the pixel may be acquired from the image information provided by the image source, and the initial value of each component may be used as the current value of each component of the pixel. Or, the initial value of each component may be converted into 8-bit data/12-bit data, and the data obtained after the conversion are taken as the current value of the corresponding component.

Similarly, the current value of each component of the pixel in the RGB space may be subjected to data conversion according to a conversion rule of color spaces, so as to obtain a current value of each component of the pixel in the YCbCr space; or, the current value of each component of the pixel in the RGB space may be subjected to data conversion according to the conversion rule of color spaces, and the data obtained after the conversion are subjected to bit conversion, so as to obtain the current value of each component of the pixel in the YCbCr space.

In the step S30, at least one image to be superimposed is generated according to the image information of the active region.

Figure 5:
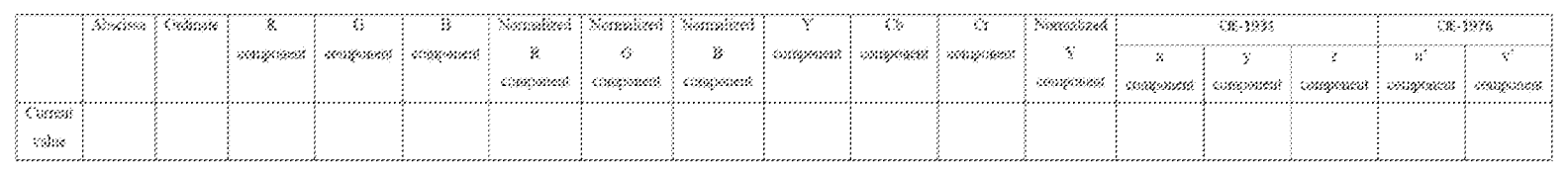

In some embodiments, the image to be superimposed generated in the step S30 at least includes a first image to be superimposed including first effective patterns configure to represent the pixel information of the target pixel. FIG. 5 is a schematic diagram of contents to be displayed in the first image to be superimposed according to some embodiments of the present disclosure. As shown in FIG. 5, in some embodiments, contents displayed in the first image to be superimposed may include: a current value of an abscissa of the target pixel, a current value of an ordinate of the target pixel, a current value of an R component of the target pixel, a current value of a G component of the target pixel, a current value of a B component of the target pixel, a current value of a normalized R component, a current value of a normalized G component, a current value of a normalized B component, a current value of a Y component of the target pixel, a current value of a Cb component of the target pixel, a current value of a Cr component of the target pixel, a current value of a normalized Y component, a current value of an x component of the target pixel in the CIE-1931 space, a current value of a y component of the target pixel in the CIE-1931 space, a current value of a z component of the target pixel in the CIE-1931 space, a current value of a u' component of the target pixel in the CIE-1976 space, and a current value of a v' component of the target pixel in the CIE-1976 space. The above contents to be displayed are patterned, and results obtained after the patterning are the first effective patterns. In this case, after the first effective patterns are superimposed on the source image and an image thus obtained is output to the display panel, the user can see a result of superimposition of the source image and the contents shown in FIG. 5. The process of patterning the contents to be displayed may be regarded as retrieving patterns corresponding to the contents to be displayed from a pre-established pattern library. For example, the contents to be displayed include the current value of the abscissa and the current value of the ordinate of the target pixel, and in a case where the current value of the abscissa is 1 and the current value of the ordinate is 2, a character pattern of "1" and a character pattern of "2" need to be retrieved from the pattern library.

FIG. 6 is a schematic diagram of the contents to be displayed in the first image to be superimposed according to some other embodiments of the present disclosure. As shown in FIG. 6, in some other embodiments, the pixel information of the target pixel may further include: a reference value of the first characteristic parameter of the target pixel, a reference value of the second characteristic parameter of the target pixel, a reference value of the abscissa of the target pixel, a reference value of the ordinate of the target pixel, a difference between the current value of the first characteristic parameter and the reference value of the first characteristic parameter of the target pixel, a difference between the current value of the second characteristic parameter and the reference value of the second characteristic parameter of the target pixel, a difference between the current value of the abscissa and the reference value of the abscissa of the target pixel, and a difference between the current value of the ordinate and the reference value of the ordinate of the target pixel. In this case, the contents to be displayed shown in FIG. 6 may be patterned to obtain the first effective patterns, and the user can see a result of superimposition of the source image and the contents shown in FIG. 6 after the first effective patterns are superimposed on the source image and an image thus obtained is output to the display panel. It should be noted that corresponding data are displayed in blank squares in the second row in FIG. 5 and blank squares in the second to fourth rows in FIG. 6 when the display panel displays the contents shown in FIG. 5 and the contents shown in FIG. 6.

The above reference value of each parameter of the target pixel may be stored in a cache module in advance, and may be updated according to a user's instruction. For example, an update request signal may be sent every time after the step S20 is finished, so as to prompt the user to input an update confirmation instruction or an update rejection instruction; when the update confirmation instruction input by the user is received, the current value of each parameter of the target pixel acquired in the step S20 is taken as a new reference value and is stored for being used in next execution of the step S20; and when the update rejection instruction input by the user is received, no reference value needs to be updated.

In some embodiments, in addition to including the first effective patterns, the first image to be superimposed may further include a first background pattern surrounding the first effective patterns, and the first background pattern is different from the first effective patterns in color, so as to display the first effective pattern more clearly. For example, a color of the first effective patterns is black (i.e., each of the R component, the G component and the B component is 0), and a color of the first background pattern may be the same as that of the target pixel, so that the user can visually and clearly see the color of the target pixel. For example, in a case where the target pixel is green, the first image to be superimposed includes a green background and the first effective patterns on the green background, and the first effective patterns may be black. As another example, in a case where the target pixel is black, the first image to be superimposed includes a black background and the first effective patterns on the black background, and at this time, the first effective patterns may be set in another color, such as white.

In some embodiments, the image to be superimposed generated in the step S30 further includes a second image to be superimposed including a plurality of sub-regions, the sub-regions of the second image to be superimposed are in one-to-one correspondence with the pixels in the active region, each sub-region corresponds to one pixel in the active region, and different sub-regions correspond to different pixels in the active region. Each sub-region includes a second effective pattern and a second background pattern surrounding the second effective pattern, and each second effective pattern is configured to represent a current value of a first characteristic parameter of a corresponding pixel. The second effective pattern is different from the second background pattern in color. For example, a color of the second background pattern may be the same as that of the corresponding pixel; when the color of the second background pattern is not black, a color of the second effective pattern may be black; and when the color of the second background pattern is black, the second effective pattern may be preset in another color, such as white.

The sub-regions of the second image to be superimposed may be arranged according to a preset rule, for example, the sub-regions are arranged in a plurality of rows and a plurality of columns, an ordinal number of a row where each sub-region is located in the second image to be superimposed is the same as that of a row where a corresponding pixel is located in the active region, and an ordinal number of a column where each sub-region is located in the second image to be superimposed is the same as that of a column where a corresponding pixel is located in the active region.

In addition, in some embodiments, the second image to be superimposed may further include a marker line pattern located at an edge of a sub-region corresponding to the target pixel, and a color of the marker line pattern is different from colors of second background patterns adjacent to the marker line pattern, so as to allow the user to see the data of the target pixel clearly. The second background patterns adjacent to the marker line pattern include a second background pattern adjacent to a second background pattern surrounded by a second marker line pattern in a row direction, and a second background pattern adjacent to the second background pattern surrounded by the second marker line pattern in a column direction. For example, the second marker line pattern may be set in a color having higher brightness (e.g., bright yellow or bright red).

Figures 7, 8:
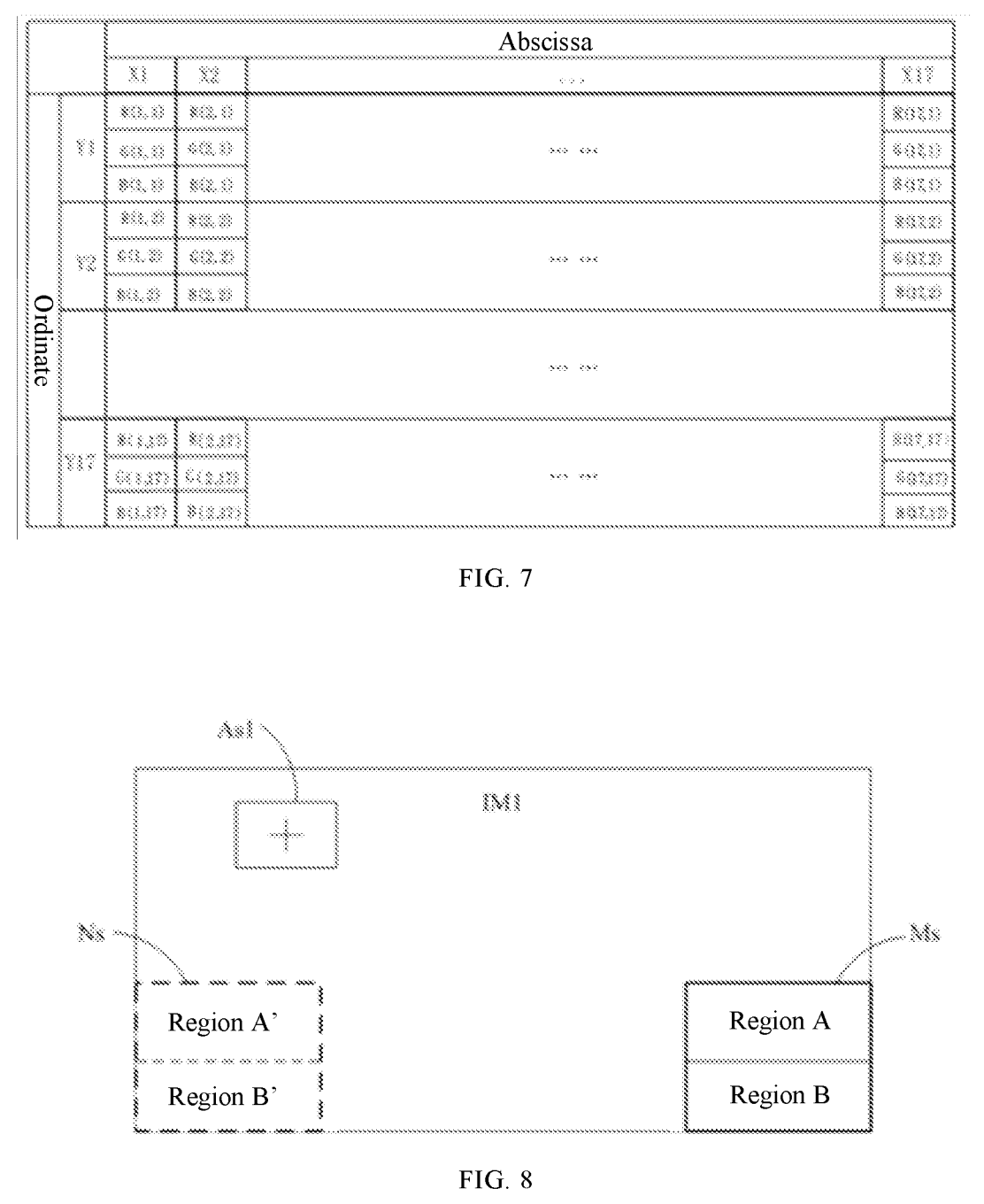

FIG. 7 is a schematic diagram of contents to be displayed in the second image to be superimposed according to some embodiments of the present disclosure. As shown in FIG. 7, the second image to be superimposed includes the plurality of sub-regions which are in one-to-one correspondence with the pixels in the active region, a background color of each sub-region is the same as the color of a corresponding pixel, and a current value of an R component of the corresponding pixel, a current value of a G component of the corresponding pixel, and a current value of a B component of the corresponding pixel are displayed in each sub-region. X1 to X16 in FIG. 7 represent abscissae of sub-pixels of the active region in the source image (i.e., ordinal numbers of columns where the sub-pixels are located in the source image), and Y0 to Y16 represent ordinates of sub-images of the active region in the source image (i.e., ordinal numbers of rows where the sub-images are located in the source image). For example, R(X1,Y17) represents a current value of an R component of a pixel which is located in the $1^{st}$ column and the $17^{th}$ row in the source image, G(X1,Y17) represents a current value of a G component of the pixel which is located in the $1^{st}$ column and the $17^{th}$ row in the source image, and B(X1,Y17) represents a current value of a B component of the pixel which is located in the $1^{st}$ column and the $17^{th}$ row in the source image. In addition, the marker line pattern is displayed at the edge of the sub-region corresponding to the target pixel.

In some embodiments, the image to be superimposed generated in the step S20 further includes a third image to be superimposed including a first mark pattern and a second mark pattern. A shape, a color and a size of the first mark pattern may be set in advance, for example, the first mark pattern may be a cross pattern. A shape and a size of the second mark pattern may be set according to a shape and a size of an edge of the active region. For example, in a case where the active region is rectangular, the second mark pattern may be a rectangular frame, and a color of the rectangular frame may be set in advance. The first mark pattern is used to mark the target coordinate position in the source image, and the second mark pattern is used to mark the edge of the active region in the source image.

In step S31, a position of a target superimposition region in the source image is determined according to a position of the active region in the source image.

The source image includes a main superimposition region and an auxiliary superimposition region, which do not overlap each other. The step S31 may specifically include: determining whether the active region overlaps the main superimposition region; if the active region overlaps the main superimposition region, taking the auxiliary superimposition region as the target superimposition region; and if the active region does not overlap the main superimposition region, taking the main superimposition region as the target superimposition region.

FIG. 8 is a schematic diagram illustrating distribution of regions in the source image according to some embodiments of the present disclosure. As shown in FIG. 8, a region in the lower right corner of the source image IM1 may be used as the main superimposition region Ms, and a region in the lower left corner of the source image IM1 may be used as the auxiliary superimposition region Ns. When the active region As1 does not overlap the main superimposition region Ms, the main superimposition region Ms may be taken as the target superimposition region, a region A in the target superimposition region may be taken as a first region to be superimposed, and a region B in the target superimposition region may be taken as a second region to be superimposed. When the active region As1 overlaps the main superimposition region Ms, the auxiliary superimposition region Ns may be taken as the target superimposition region, a region A' in the target superimposition region may be taken as the first region to be superimposed, and a region B' in the target superimposition region may be taken as the second region to be superimposed.

It should be noted that the distribution of the regions illustrated by FIG. 8 is only an example, and other ways may also be used to determine the first region to be superimposed and the second region to be superimposed.

In the step S40, each image to be superimposed is superimposed on the source image to obtain an output image, and the output image is output to the display panel to be displayed.

In some embodiments, in the step S40, the first image to be superimposed is superimposed on the first region to be superimposed of the source image, the second image to be superimposed is superimposed on the second region to be superimposed of the source image, and the third image to be superimposed is superimposed on the active region of the source image. A center of the first mark pattern of the third image to be superimposed corresponds to the target coordinate position, and the second mark pattern of the third image to be superimposed corresponds to a boundary position of the active region.

In some embodiments, the step S40 specifically includes steps S41 to S43.

In the step S41, a region to be superimposed of the source image, which corresponds to each image to be superimposed, is determined, with the region to be superimposed being a region of the source image in which the image to be superimposed is superimposed, and pixels in the region to be superimposed being in one-to-one correspondence with pixels in the corresponding image to be superimposed.

For example, the region to be superimposed corresponding to the first image to be superimposed is the first region to be superimposed, the region to be superimposed corresponding to the second image to be superimposed is the second region to be superimposed, and the region to be superimposed corresponding to the third image to be superimposed is the activated region.

In the step S42, for any region to be superimposed and the corresponding image to be superimposed, a conversion pixel value of each pixel in the region to be superimposed is generated according to a first weight and an initial pixel value of each pixel in the region to be superimposed; a conversion pixel value of each pixel in the image to be superimposed is generated according to a second weight and an initial pixel value of each pixel in the image to be superimposed; and then a target pixel value of each pixel in the region to be superimposed is obtained according to the conversion pixel value of each pixel in the region to be superimposed and the conversion pixel value of each pixel in the image to be superimposed.

The initial pixel value of each pixel may include an initial value of an R component, an initial value of a G component, and an initial value of a B component; and the conversion pixel value of each pixel may include a conversion value of the R component, a conversion value of the G component, and a conversion value of the B component. For any pixel in the region to be superimposed, the conversion value of the R component of the pixel may be a product of the initial value of the R component of the pixel and the first weight; the conversion value of the G component of the pixel may be a product of the initial value of the G component of the pixel and the first weight; and the conversion value of the B component of the pixel may be a product of the initial value of the B component of the pixel and the first weight. For any pixel in the image to be superimposed, the conversion value of the R component of the pixel may be a product of the initial value of the R component of the pixel and the second weight; the conversion value of the G component of the pixel may be a product of the initial value of the G component of the pixel and the second weight; and the conversion value of the B component of the pixel may be a product of the initial value of the B component of the pixel and the second weight.

The target pixel value of each pixel may include: a target value of the R component, a target value of the G component, and a target value of the B component. For convenience of description, each pixel in the region to be superimposed is referred to as a first pixel, and each pixel in the image to be superimposed is referred to as a second pixel, so the process of obtaining the target pixel value of any first pixel includes: adding the conversion value of the R component of the first pixel to the conversion value of the R component of a corresponding second pixel to obtain the target value of the R component of the first pixel; adding the conversion value of the G component of the first pixel to the conversion value of the G component of the corresponding second pixel to obtain the target value of the G component of the first pixel; and adding the conversion value of the B component of the first pixel to the conversion value of the B component of the corresponding second pixel to obtain the target value of the B component of the first pixel.

Both the first weight and the second weight may be in the range of [0,1], so as to ensure that the target values of each component of the first pixels can fall within a normal range. For example, in a case where the initial values of each component of the first pixels are in the range of [0,255], and the initial values of each component of the second pixels are in the range of [0,255], it can be ensured that the target value of each component of each first pixel is also in the range of [0,255] when both the first weight and the second weight are in the range of [0, 1]. In addition, a sum of the first weight and the second weight may be 1, so that the contents of the source image and/or the contents of the image to be superimposed can be clearly shown in the subsequently obtained output image.

In the step S43, the initial pixel value of each pixel in each region to be superimposed of the source image is updated by the target pixel value, so as to obtain the output image.

In some examples, the first weight and the second weight may be set in advance. In some other examples, the first weight and the second weight may be adjusted according to an instruction input by the user.

A final display effect of the image to be superimposed may be adjusted by adjusting magnitude of the first weight and magnitude of the second weight. For example, when both the first weight and the second weight are less than 1, a display effect of the output image is that the image to be superimposed is superimposed on the source image in a semitransparent manner; and when the first weight is 0 and the second weight is 1, the display effect of the output image is that the image to be superimposed is superimposed on the source image in an opaque manner. When the first weight and the second weight are changed, transparency of the image to be superimposed is changed.

It should be noted that the image to be superimposed generated in the step S30 includes the first image to be superimposed, the second image to be superimposed, and the third image to be superimposed according to the above embodiments, but the embodiments of the present disclosure are not limited thereto. For example, the image to be superimposed generated in the step S30 may include the first image to be superimposed and the third image to be superimposed, but not include the second image to be superimposed. As another example, the image to be superimposed generated in the step S30 may include the second image to be superimposed and the third image to be superimposed, but not include the first image to be superimposed.

When the image to be superimposed generated in the step S30 does not include the second image to be superimposed, the image information of the active region acquired in the step S20 may include the pixel information of the target pixel, but does not include the current values of the first characteristic parameters of the other pixels. When the image to be superimposed generated in the step S30 does not include the first image to be superimposed, the image information of the active region acquired in the step S20 may include the current value of the first characteristic parameter of each pixel, but does not include the current value of the second characteristic parameter of the target pixel.

Figure 9:
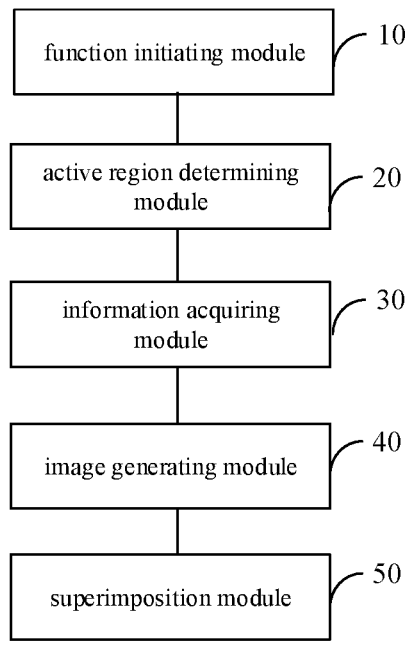
FIG. 9 is a schematic diagram of a display control device according to some embodiments of the present disclosure.

The embodiments of the present disclosure further provide a display control device configured to perform the above display control method. FIG. 9 is a schematic diagram of a display control device according to some embodiments of the present disclosure. As shown in FIG. 9, the display control device includes: a function initiating module 10, an active region determining module 20, an information acquiring module 30, an image generating module 40, and a superimposition module 50.

The function initiating module 10 is configured to output an initiation signal to the active region determining module in response to a data visualization display instruction.

The active region determining module 20 is configured to determine, after receiving the initiation signal, a target coordinate position corresponding to a coordinate selection instruction in a source image displayed on a display panel in response to the coordinate selection instruction, and determine an active region at least covering the target coordinate position according to the target coordinate position.

Reference may be made to the above description for a specific process of determining the active region, and the specific process will not be repeated here.

The information acquiring module 30 is configured to acquire image information of the active region, with the image information of the active region including pixel information of at least some pixels in the active region.

The image generating module 40 is configured to generate at least one image to be superimposed according to the image information of the active region; and the at least one image to be superimposed includes a pattern configured to represent the image information of the active region.

The data included in the image information of the active region and a process of generating a first image to be superimposed according to the image information of the active region may be found in the above description, and thus will not be repeated here.

The superimposition module 50 is configured to superimpose each of the at least one image to be superimposed on the source image to obtain an output image, and output the output image to the display panel to be displayed.

In some embodiments, the superimposition module 50 may specifically include: a determination unit, a calculation unit and a generation unit. The determination unit is configured to determine a region to be superimposed of the source image corresponding to each image to be superimposed, the region to be superimposed is a region of the source image in which the image to be superimposed is superimposed, and pixels in the region to be superimposed are in one-to-one correspondence with pixels in the corresponding image to be superimposed. The calculation unit is configured to generate, for any region to be superimposed and the corresponding image to be superimposed, a conversion pixel value of each pixel in the region to be superimposed according to a first weight and an initial pixel value of each pixel in the region to be superimposed, generate a conversion pixel value of each pixel in the image to be superimposed according to a second weight and an initial pixel value of each pixel in the image to be superimposed, and obtain a target pixel value of each pixel in the region to be superimposed according to the conversion pixel value of each pixel in the region to be superimposed and the conversion pixel value of each pixel in the image to be superimposed. The generation unit is configured to replace the initial pixel value of each pixel in each region to be superimposed of the source image with the target pixel value to generate the output image.

In some embodiments, as described above, the image information of the active region may include the reference values of a plurality of parameters of the target pixel, such as the reference value of the first characteristic parameter, the reference value of the second characteristic parameter, the reference value of the abscissa, and the reference value of the ordinate. In this case, the display control device may further include a cache module configured to cache the reference values of the plurality of parameters of the target pixel.

The embodiments of the present disclosure further provide a non-transitory computer-readable storage medium having a computer program stored thereon, and the computer program implements the display control method described in the above embodiments when being executed by a processor.

The non-transitory computer-readable storage medium includes, but is not limited to, readable media as follows: a Random Access Memory (RAM), a Read-Only Memory (ROM), a Non-Volatile Random Access Memory (NVRAM), a Programmable Read-Only Memory (PROM), an Erasable Programmable Read-Only Memory (EPROM), an Electrically Erasable PROM (EEPROM), a flash memory, a magnetic or optical data memory, a register, a magnetic disk or a magnetic tape, an optical storage medium such as a Compact Disc (CD) or a Digital Versatile Disk (DVD), and other non-transitory media. Examples of the processor include, but are not limited to, a general purpose processor, a Central Processing Unit (CPU), a microprocessor, a Digital Signal Processor (DSP), a controller, a microcontroller, and a state machine.

Figure 10:
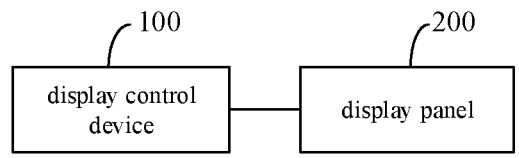
FIG. 10 is a schematic diagram of a display device according to some embodiments of the present disclosure.

FIG. 10 is a schematic diagram of a display device according to some embodiments of the present disclosure. As shown in FIG. 10, the display device includes: a display panel 200 and the display control device 100 described above. The display panel 200 is configured to display an output image generated by the display control device 100.

In particular, the display device may be a monitor apparatus.

It should be understood that the above embodiments are merely exemplary embodiments adopted to illustrate the principle of the present disclosure, and the present disclosure is not limited thereto. Various modifications and improvements can be made by those of ordinary sill in the art without departing from the spirit and essence of the present disclosure, and those modifications and improvements are also considered to fall within the scope of the present disclosure.

What is claimed is:

1. A display control method, comprising performing following steps in response to a data visualization display instruction:
   in response to a coordinate selection instruction, determining a target coordinate position corresponding to the coordinate selection instruction in a source image displayed on a display panel, and determining, according to the target coordinate position, an active region at least covering the target coordinate position;
   acquiring image information of the active region;
   generating at least one image to be superimposed according to the image information of the active region, with the at least one image to be superimposed comprising a pattern configured to represent the image information of the active region; and superimposing each of the at least one image to be superimposed on the source image to obtain an output image, and outputting the output image to the display panel to be displayed on the display panel;

wherein the image information of the active region comprises pixel information of a target pixel located at the target coordinate position in the active region, and the pixel information of the target pixel comprises: a current value of a first characteristic parameter of the target pixel, and a current value of a second characteristic parameter obtained by performing characteristic conversion on the current value of the first characteristic parameter of the target pixel, a reference value of the first characteristic parameter of the target pixel, a difference between the current value of the first characteristic parameter and the reference value of the first characteristic parameter of the target pixel, a reference value of the second characteristic parameter of the target pixel, and a difference between the current value of the second characteristic parameter and the reference value of the second characteristic parameter of the target pixel.

2. The display control method of claim 1, wherein the at least one image to be superimposed comprises a first image to be superimposed, and the first image to be superimposed comprises first effective patterns for representing the pixel information of the target pixel; and in the step of superimposing each of the at least one image to be superimposed on the source image, the first image to be superimposed is superimposed on a first region to be superimposed in a target superimposition region of the source image;

and/or the image information of the active region comprises a current value of a first characteristic parameter of each pixel in the active region; the at least one image to be superimposed comprises a second image to be superimposed comprising a plurality of second effective patterns, each of the plurality of second effective patterns corresponds to one pixel in the active region, and different second effective patterns correspond to different pixels in the active region; each of the plurality of second effective patterns is configured to represent a current value of a first characteristic parameter of a corresponding pixel; and in the step of superimposing each of the at least one image to be superimposed on the source image, the second image to be superimposed is superimposed on a second region to be superimposed in the target superimposition region of the source image.

3. The display control method of claim 2, wherein the first characteristic parameter comprises an R component of the pixel in RGB space, a G component of the pixel in the RGB space, and a B component of the pixel in the RGB space; and the second characteristic parameter comprises at least one of:

a normalized R component, a normalized G component, a normalized B component, a Y component of the pixel in YCbCr space, a Cb component of the pixel in the YCbCr space, a Cr component of the pixel in the YCbCr space, a normalized Y component, an x component of the pixel in CIE-1931 space, a y component of the pixel in the CIE-1931 space, a z component of the pixel in the CIE-1931 space, a u' component of the pixel in CIE-1976 space, and a v' component of the pixel in the CIE-1976 space.

4. The display control method of claim 2, wherein the at least one image to be superimposed comprises the first image to be superimposed, the first image to be superimposed comprises the first effective patterns for representing the pixel information of the target pixel and a first background pattern surrounding the first effective patterns, and the first effective patterns are different from the first background pattern in color.

5. The display control method of claim 4, wherein a color of the first background pattern is the same as that of the target pixel.

6. The display control method of claim 2, wherein the at least one image to be superimposed further comprises: a third image to be superimposed comprising a first mark pattern and a second mark pattern; and in a step of superimposing the third image to be superimposed on the source image, the third image to be superimposed is superimposed on the active region, wherein a center of the first mark pattern corresponds to the target coordinate position, and the second mark pattern corresponds to a boundary position of the active region.

7. The display control method of claim 2, wherein the source image comprises: a main superimposition region and an auxiliary superimposition region, which do not overlap each other; and the display control method further comprises:
determining whether the active region overlaps the main superimposition region; and
when the active region overlaps the main superimposition region, taking the auxiliary superimposition region as the target superimposition region.

8. The display control method of claim 1, wherein the reference value of the first characteristic parameter and the reference value of the second characteristic parameter are stored in a cache module in advance, and the display control method further comprises:
after the image information of the active region is acquired, sending an update request signal to prompt a user to input an update confirmation instruction or an update rejection instruction, and
upon receiving the update confirmation instruction, updating the reference value of the first characteristic parameter stored in the cache module according to the current value of the first characteristic parameter, and updating the reference value of the second characteristic parameter stored in the cache module according to the current value of the second characteristic parameter.

9. The display control method of claim 1, wherein the superimposing each of the at least one image to be superimposed on the source image to obtain the output image, comprises:

determining a region to be superimposed of the source image which corresponds to each image to be superimposed, with the region to be superimposed being a region of the source image in which the image to be superimposed is superimposed, and pixels in the region to be superimposed being in one-to-one correspondence with pixels in a corresponding image to be superimposed;

for any region to be superimposed and the corresponding image to be superimposed, generating a conversion pixel value of each pixel in the region to be superimposed according to a first weight and an initial pixel value of each pixel in the region to be superimposed; generating a conversion pixel value of each pixel in the image to be superimposed according to a second weight and an initial pixel value of each pixel in the image to be superimposed; and obtaining a target pixel value of each pixel in the region to be superimposed according to the conversion pixel value of each pixel in the region to be superimposed and the conversion pixel value of each pixel in the image to be superimposed; and replacing the initial pixel value of each pixel in each region to be superimposed of the source image with the target pixel value, so as to obtain the output image.

10. The display control method of claim 1, wherein the determining the active region according to the target coordinate position comprises:

determining the active region according to the target coordinate position and regional size parameters.

11. A non-transitory computer-readable storage medium having a computer program stored thereon, wherein the computer program implements the display control method of claim 1 when being executed by a processor.

12. A display control method, comprising performing following steps in response to a data visualization display instruction:

in response to a coordinate selection instruction, determining a target coordinate position corresponding to the coordinate selection instruction in a source image displayed on a display panel, and determining, according to the target coordinate position, an active region at least covering the target coordinate position;

acquiring image information of the active region;

generating at least one image to be superimposed according to the image information of the active region, with the at least one image to be superimposed comprising a pattern configured to represent the image information of the active region; and superimposing each of the at least one image to be superimposed on the source image to obtain an output image, and outputting the output image to the display panel to be displayed on the display panel;

wherein the image information of the active region comprises pixel information of a target pixel located at the target coordinate position in the active region, the pixel information of the target pixel comprises a current value of a first characteristic parameter of the target pixel, and a current value of a second characteristic parameter obtained by performing characteristic conversion on the current value of the first characteristic parameter of the target pixel; the at least one image to be superimposed comprises a first image to be superimposed, and the first image to be superimposed comprises first effective patterns for representing the pixel information of the target pixel; and in the step of superimposing each of the at least one image to be superimposed on the source image, the first image to be superimposed is superimposed on a first region to be superimposed in a target superimposition region of the source image;

and/or the image information of the active region comprises a current value of a first characteristic parameter of each pixel in the active region; the at least one image to be superimposed comprises a second image to be superimposed comprising a plurality of second effective patterns, each of the plurality of second effective patterns corresponds to one pixel in the active region, and different second effective patterns correspond to different pixels in the active region; each of the plurality of second effective patterns is configured to represent a current value of a first characteristic parameter of a corresponding pixel; and in the step of superimposing each of the at least one image to be superimposed on the source image, the second image to be superimposed is superimposed on a second region to be superimposed in the target superimposition region of the source image;

wherein the at least one image to be superimposed comprises the second image to be superimposed comprising a plurality of sub-regions, each of the plurality of sub-regions corresponds to one pixel in the active region, and different sub-regions correspond to different pixels in the active region; and each of the plurality of sub-regions comprises the second effective pattern and a second background pattern surrounding the second effective pattern, and the second effective pattern is configured to represent the current value of the first characteristic parameter of the corresponding pixel in the active region; and the second effective pattern is different from the second background pattern in color.

13. The display control method of claim 12, wherein a color of the second background pattern is the same as that of the corresponding pixel.

14. The display control method of claim 12, wherein the second image to be superimposed further comprises a marker line pattern located at an edge of a sub-region corresponding to the target pixel which is the pixel located at the target coordinate position in the active region, and a color of the marker line pattern is different from colors of second background patterns adjacent to the marker line pattern.

15. The display control method of claim 12, wherein the plurality of sub-regions of the second image to be superimposed are arranged according to a preset rule.

16. A display control device, comprising: a function initiating module, an active region determining module, an information acquiring module, an image generating module, and a superimposition module, wherein the function initiating module is configured to output an initiation signal to the active region determining module in response to a data visualization display instruction;

the active region determining module is configured to determine, after receiving the initiation signal, a target coordinate position corresponding to a coordinate selection instruction in a source image displayed on a display panel in response to the coordinate selection instruction, and determine, according to the target coordinate position, an active region at least covering the target coordinate position corresponding to the coordinate selection instruction;

the information acquiring module is configured to acquire image information of the active region;

the image generating module is configured to generate at least one image to be superimposed according to the image information of the active region, with the at least one image to be superimposed comprising a pattern configured to represent the image information of the active region; and the superimposition module is configured to superimpose each of the at least one image to be superimposed on the source image to obtain an output image, and output the output image to the display panel to be displayed;

wherein the image information of the active region comprises pixel information of a target pixel located at the target coordinate position in the active region, and the pixel information of the target pixel comprises: a current value of a first characteristic parameter of the target pixel, and a current value of a second characteristic parameter obtained by performing characteristic conversion on the current value of the first characteristic parameter of the target pixel, a reference value of the first characteristic parameter of the target pixel, a difference between the current value of the first characteristic parameter and the reference value of the first characteristic parameter of the target pixel, a reference value of the second characteristic parameter of the target pixel, and a difference between the current value of the second characteristic parameter and the reference value of the second characteristic parameter of the target pixel.

17. The display control device of claim 16, wherein the superimposition module comprises:

a determination unit configured to determine a region to be superimposed of the source image corresponding to each image to be superimposed, with the region to be superimposed being a region of the source image in which the image to be superimposed is superimposed, and pixels in the region to be superimposed being in one-to-one correspondence with pixels in a corresponding image to be superimposed;

a calculation unit configured to generate, for any region to be superimposed and the corresponding image to be superimposed, a conversion pixel value of each pixel in the region to be superimposed according to a first weight and an initial pixel value of each pixel in the region to be superimposed, generate a conversion pixel value of each pixel in the image to be superimposed according to a second weight and an initial pixel value of each pixel in the image to be superimposed, and obtain a target pixel value of each pixel in the region to be superimposed according to the conversion pixel value of each pixel in the region to be superimposed and the conversion pixel value of each pixel in the image to be superimposed; and a generation unit configured to replace the initial pixel value of each pixel in each region to be superimposed of the source image with the target pixel value to generate the output image.

18. A display device, comprising: a display panel, and the display control device of claim 16.

* * * * *